United States Patent Office 3,382,956
Patented May 14, 1968

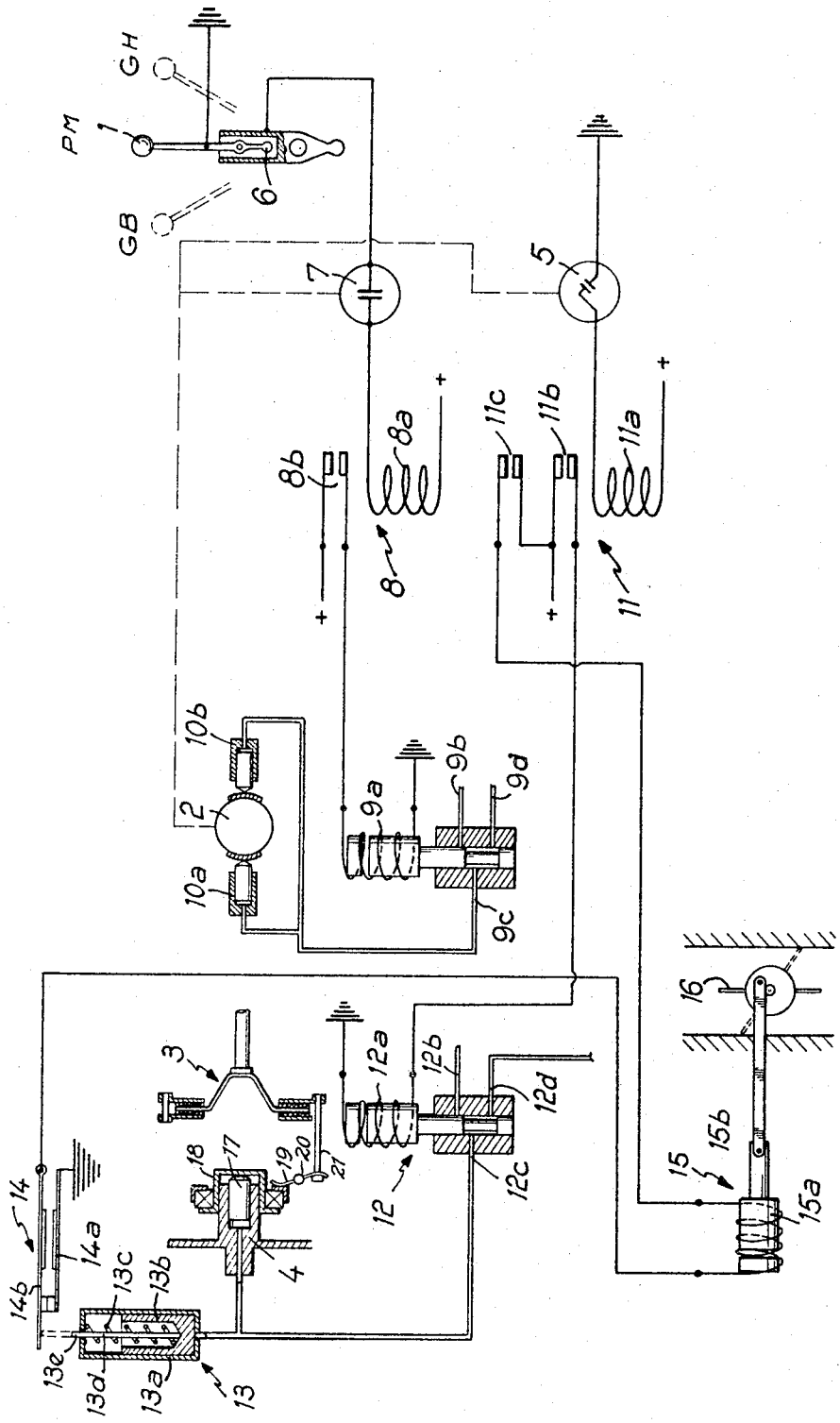

3,382,956
FLUID PRESSURE ENGAGED CLUTCH WITH THROTTLE CLOSING MEANS
Edmond Henry-Biabaud, Paris, France, assignor to Societe Anonyme Andre Citroen, Paris, France
Filed Feb. 15, 1966, Ser. No. 528,959
Claims priority, application France, Feb. 22, 1965, 6,552
4 Claims. (Cl. 192—.084)

ABSTRACT OF THE DISCLOSURE

An automatic gear box having a hydraulically operated clutch located at the input and an electromagnetically operated auxiliary throttle valve coacting with the clutch to reduce the torque from a motor when the clutch is engaged. The gear box has at least one pair of electrical contacts in the electrical supply circuit of the auxiliary valve, a hydraulic cylinder for actuating at least one of the pair of contacts in response to the action of pressurized fluid supplied to control the clutch and means located in the pressurized fluid supply, for delaying the operation of one of the pair of contacts.

---

The present invention relates to automatic gear changing for motor vehicles and has for an object, improvements therein.

Various types of automatic gearboxes for motor vehicles are already known, such as the gear box shown in French Patent No. 1,371,958 of July 31, 1963 in the name of Societe Anonyme Andre Citroen. The automatic gear box of the said French patent, includes, in particular, apart from the gear trains, a hydraulically operated clutch for coupling the drive shaft and the driven shaft through one of a plurality of predetermined gear trains.

Moreover, an auxiliary throttle valve causes a reduction of engine torque during gear changing and, in such an installation, this auxiliary throttle valve is actuated by an automatically controlled servo-motor.

After the gears have been automatically changed and the auxiliary valve has been throttled down, it is desirable that the reopening of the latter takes place only when the driving and driven shafts have been completely or almost completely recoupled.

This invention has for an object the control of an auxiliary throttle valve the action of which, upon reopening, is delayed, preferably, in dependence upon the position of the clutch.

To this end, the circuit of an electromagnet, connected to control the auxiliary valve and preferably acting positively in the direction of closing of said valve, comprises an electrical contact actauted by the pressurised fluid supplying the hydraulic controller for the clutch, the operation of said contact being delayable. This delay is preferably effected by a partly flexible reservoir having a compressible means therein and connected in parallel with the main hydraulic clutch controller.

This reservoir may be, for example, a cylinder enclosing a piston subjected to the action of a spring against the action of the fluid which passes into said cylinder, said piston being connected to a push button, the external end of which is secured to the moving part of the above-mentioned electrical contact.

In order that the invention may be more readily understood, reference will now be made to the accompaying drawing which shows a schematic view of one embodiment of automatic gear change control comprising a device according to the invention, the gearbox itself being assumed to be of the type described in the above-mentioned French patent.

Referring now to the drawing, the control comprises a hand lever 1 which can be selectively moved to a neutral position PM, a "low" position GB, and a "high" position GH, reverse drive being separately controllable.

In each of the ranges, there are two gear reducing ratios which may be referred to as 1st and 2nd gear in the low range GB, and as 3rd and 4th gear in the high range GH.

In the first and third gear positions, the vehicle is driven by means of a hydraulic converter which can operate as a coupling device (not shown in the drawing) but which would be coupled to the shaft 2.

In the second and fourth gear positions, the vehicle is driven by means of a friction clutch 3 operable by a hydraulic controller 4 when supplied with a pressurised fluid.

The change, within one of the two ranges, from one ratio to the other, both up and down, is controlled by a relay 5 which is itself controlled by a detector (not shown) sensitive, for example, to the speed and to the torque of the engine. The detector may advantageously be of the type described in the French patent of the French company, Societe Anonyme Andre Citroen, No. 1,113,984 of Nov. 6, 1954.

The lever 1 forms part of a switch 6, one terminal of which is connected to ground and the other to a stop-detector switch 7, a stop detector, the second terminal of which is connected to a terminal of a coil 8a of a relay 8, the other end of the coil 8a being connected to the positive terminal of an electrical supply.

The relay 8 has two contacts 8b one of which is connected to the positive terminal of an electrical supply source and the other of which is connected to one end of a coil 9a. The other end of coil 9a is connected to ground. The coil 9a forms part of an electrically-operated valve 9 having a pipe 9b for the supply of pressurised fluid, a pipe 9c for connection to two hydraulic controllers 10a, 10b, and a discharge pipe 9d. The piston rods of the controllers 10a and 10b are located on either side of the shaft 2, and carry brake shoes capable of being applied against this shaft at diametrically opposite points.

The relay 5 is connected on the one hand to ground, and on the other hand to a terminal of a coil 11a. The other terminal of coil 11a is connected to the positive terminal of an electrical supply source forming part of a relay 11 having two pairs of contacts 11b–11c.

One of the pair of contacts 11b is connected to the positive terminal of the supply source and the other is connected to a terminal of a coil 12a. The other terminal of coil 12a is connected to ground. The coil forms part of an electrically-operated valve 12 having a pipe 12b for supplying pressurised fluid, a pipe 12c connected to the controller 4 of the clutch 3 and to a reservoir 13, and a discharge pipe 12d.

The reservoir 13 is a closed cylinder 13a, transversely divided into two chambers by a piston 13b. One of the chambers receives the fluid coming from the valve 12, the other contains a spring 13c opposing the action of the fluid and surrounding a rod 13d. The latter is secured to the piston 13b by one of its ends and its other end 13e projects outwardly from the cylinder 13a. Opposite to the end 13e of the rod 13d there is a switch 14 of which one fixed contact 14a is grounded while the moving contact 14b, capable of mechanically cooperating with the end 13e, is connected to a terminal of a coil 15a of a solenoid 15. In the rest of the non-operating position there is a large clearance between the end 13e and the contact 14b.

The other terminal of the coil 15a is connected to one of the pair of contacts 11c, while the other contact of this pair is connected to the positive terminal of the electrical supply source.

The end of the plunger 15b of the solenoid 15 is mechanically attached, in any desired fashion, to an auxiliary throttle valve 16.

It will be noted that the switch 14 is in series with the solenoid 15 which can be energised only when this switch 14 is closed. The latter is moreover closed in rest position (as is shown in the drawing) which corresponds to the driving position of the gear box by means of the hydraulic converter-coupling device.

Similarly, the coil 15a is isolated, the auxiliary valve 16 is opened, the clutch 3 is declutched and the switch 5 is opened in their rest or normal positions.

When the vehicle stops, the switch 7 is closed and the hydraulic clutch drives the shaft 2 at a decelerated speed.

The vehicle is first started by placing the lever 1 in the low GB position. This change is facilitated with the aid of the switch 6 which, on closing, closes the supply circuit of the coil 8a which in its turn closes the contacts 8b, thus putting the valve 9 into operation. The latter permits the supply of the controllers 10a, 10b, whose jaws stop the rotation of the shaft 2. The immobilization of the latter makes it possible for first gear to be engaged. As soon as the vehicle is travelling at a predetermined moderate speed, the switch 7 is opened and switches off the whole of this part of the control which is only used for starting.

When the vehicle has reached the maximum speed permitted by the first gear ratio, the detector, which is sensitive to the speed and to the torque of the engine, controls the closing of the relay 5, thus permitting the coil 11a to be energised.

The contacts 11b, 11c which are normally open, are closed and the following movements are simultaneously produced:

The coil 15a is energised and the solenoid 15 closes the auxiliary throttle valve, thus reducing the torque.

The coil 12a is energised and the valve 12 permits the controller 4 and the reservoir 13 to be supplied with pressurised fluid.

The piston 17 of the controller 4 is then biased to the right as shown in the drawing. The piston 17 moves the cup shaped member 18 which in turn causes the rod 19 to pivot about a pin 20 thereby causing rod 21 to engage clutch 3.

The reservoir 13 begins to fill with fluid which pushes the piston 13b against the action of the spring 13c, while the rod 13d is pushed from the cylinder 13a.

It is only when the clutch 3 is completely engaged that the pressure becomes high enough to completely compress the spring 13c in the reservoir 13 and that the end 13e reaches the moving contact 14b, which it pushes away from the contact 14a. The supply circuit of the solenoid 15 is consequently interrupted and the valve 16 opens again.

It is to be noted that the reopening of the auxiliary valve is delayed with respect to the coupling operation effected by the clutch 3; this delay time is under the influence of the actual functioning of this clutch.

If the vehicle is further accelerated, a change is made with the lever 1, to the high range GH. The drive is then effected by the hydraulic clutch, in third gear. The relay 5 is opened under the action of the torque detector. The contacts 11b, 11c are opened, the valve 12 puts the controller 4 and the reservoir 13 in communication with the discharge pipe 12d. The clutch 3 is out of operation and the rod 13d returns to the inside of the cylinder 13a. The device is ready for a new cycle of operation when, if the vehicle is again accelerated, the relay 5 will close under the influence of the detector for automatically changing into fourth gear.

The above description relates to a preferred, particularly advantageous embodiment of the invention. It is obvious that numerous modifications may be made thereto, for example, the normal positions of rest or action of certain components could be reversed, and such modifications would be within the skill of one familiar with the art and the scope of the invention as defined in the following claims.

I claim:

1. An automatic gear box having a hydraulically operated clutch located at the input where torque is supplied by an engine, said gear box comprising an electromagnetically operated auxiliary throttle valve to reduce the torque from said engine when said clutch is engaged, at least one pair of electrical contacts in the electrical supply circuit of said auxiliary valve, operating means for actuating at least one of said pair of contacts in response to the action of the pressurized fluid supplied to control said clutch, and means for delaying the operation of said one of said pair of contacts, said means being located in the pressurized fluid supply.

2. The device of claim 1 wherein the delay means comprises a reservoir having compressible means therein, said compressible means including a movable component having a portion projecting from said reservoir capable of cooperating with said one of the pair of contacts, and means connecting said reservoir in parallel with the pressurized fluid supply of said clutch.

3. The device of claim 2 in which said reservoir comprises a cylinder and said movable component comprises a piston, said piston being spring biased in opposition to the action of the pressurized fluid supplied to said reservoir and said projecting portions is a rod extending from said piston and through the wall of said cylinder for moving said one of the pair of contacts.

4. The device of claim 3 wherein said rod contacts said one of the pair of contacts at the end of the delay period, thereby opening the supply circuit of said electromagnet and closing said auxiliary valve.

References Cited

UNITED STATES PATENTS

| | | | |
|---|---|---|---|
| 2,229,055 | 1/1941 | Dick | 192—.084 |
| 2,446,711 | 8/1948 | Mallory | 192—.084 X |
| 2,572,660 | 10/1951 | Price | 192—.084 X |
| 3,207,277 | 9/1965 | Spense | 192—.096 |

BENJAMIN W. WYCHE III, *Primary Examiner.*